United States Patent [19]

McClelland

[11] Patent Number: 4,532,397
[45] Date of Patent: Jul. 30, 1985

[54] OVENWARE RECEPTACLE SYSTEM

[75] Inventor: Donald R. McClelland, Wooster, Ohio

[73] Assignee: Rubbermaid Incorporated, Wooster, Ohio

[21] Appl. No.: 395,652

[22] Filed: Jul. 6, 1982

[51] Int. Cl.³ .............................................. H05B 6/80
[52] U.S. Cl. .............................. 219/10.55 E; 99/323.5; 426/243
[58] Field of Search ................. 219/10.55 E, 10.55 R, 219/10.55 F; 99/323.5, 323.8; 426/243, 244, 245; 206/499, 500, 501, 514

[56] References Cited

U.S. PATENT DOCUMENTS

| 2,980,280 | 4/1961 | Herløw | 206/514 X |
| 3,847,067 | 11/1974 | Munsey | 99/323.8 |
| 4,158,760 | 6/1979 | Bowen et al. | 219/10.55 E |
| 4,477,705 | 10/1984 | Danley et al. | 219/10.55 E |

FOREIGN PATENT DOCUMENTS

WO80/01483  7/1980  PCT Int'l Appl. .......... 219/10.55 E

OTHER PUBLICATIONS

Micro Chef, Jan. 1980—Bangor Plastics, Inc., Bangor, Michigan.
Nordic Ware, Jul. 1981—Nordic Ware, Minneapolis, Minnesota.
Regal Microwave Cookware, prior to 1982—Regal Ware, Inc., Kewaskum, Wis.
Microwave Popcorn Popper, prior to 1982—Anchor Hocking Corp., Lancaster, Ohio.

Primary Examiner—Roy N. Envall, Jr.
Assistant Examiner—M. M. Lateef
Attorney, Agent, or Firm—Renner, Kenner, Greive & Bobak Co.

[57] ABSTRACT

An ovenware receptacle system for popping grain in a microwave oven comprising a storage receptacle (14), a conical popper receptacle (12) and a perforated receptacle (13) all having upper rims adapted to fit one upon another with the popper receptacle and the perforated receptacle selectively in upright or inverted position for confining popped kernels within said perforated receptacle when inverted and transferring said popped kernels to said storage receptacle (14) by removing said popper receptacle (12) and bodily re-inverting said storage receptacle (14) and perforated receptacle (13).

9 Claims, 10 Drawing Figures

OVENWARE RECEPTACLE SYSTEM

TECHNICAL FIELD

This invention relates to microwave oven receptacles designed to be selectively combined for popping grain and storing popped grain, and for defrosting, cooking and steaming other foods, said receptacles adapted for nesting one within another when not in use.

BACKGROUND OF THE INVENTION

It is common practice to expand cereal grains such as wheat, rice and popcorn by the application of heat in conventional ovens. Normally the receptacle containing the grains must be agitated during heating so that all of the grains are heated substantially uniformly without burning the popped or expanded kernels.

More recently, with the advent of microwave ovens, receptacles transparent to microwaves have been provided for popping grains, said receptacles having a lower region of restricted internal volume for retaining the unpopped kernels in a massed clump and an upper region of greater volume for collecting and containing the popped grains. A preferred configuration for such a receptacle is conical, and such a receptacle is disclosed in U.S. Pat. Nos. 4,158,760 and 4,156,806.

The receptacles of said patents require a specially designed supporting base or frame of microwave transparent material. A flat perforated lid is preferably provided for retaining popped kernels within the receptacle while allowing the escape of steam created by the heating of the kernels. Consequently, the capacity for storing popped grain is strictly limited by the downwardly restricted configuration of the conical wall.

Moreover, the receptacles of said patents are not designed or adapted to be used in combination with other receptacles for other purposes such as cooking and steaming foods.

Certain other corn popping receptacles of which I am aware are bulky and inefficient, do not nest well for storage, and require additional receptacles when used for other purposes.

DISCLOSURE OF INVENTION

The present invention provides a minimum number of three pieces adapted to be combined in one way for popping grain and storing popped grain, and to be combined in other ways for defrosting, cooking and steaming foods without requiring additional receptacles.

It is an object of the present invention to provide an improved system of microwave oven receptacles of novel construction adapted to be combined for popping grain and storing popped kernels.

Another object is to provide an improved system of novel microwave oven receptacles adapted to be arranged in combination for defrosting frozen foods.

Another object is to provide an improved system of novel microwave oven receptacles adapted to be arranged in combination for cooking and steaming various foods.

A further object is to provide an improved system of novel microwave oven receptacles adapted to be nested into a compact space when not in use.

A still further object is to provide an improved system of novel microwave oven receptacles adapted to be arranged in combination for various purposes, at least two of said receptacles adapted for use individually for other purposes.

These and other objects are accomplished by the parts, improvements and combinations comprising the present invention, preferred embodiments of which are disclosed herein by way of example as representing the best known mode of practicing the invention. Various modifications and changes in details of construction and arrangement are comprehended within the scope of the appended claims.

PREFERRED EMBODIMENTS FOR CARRYING OUT THE INVENTION

Figure 1:
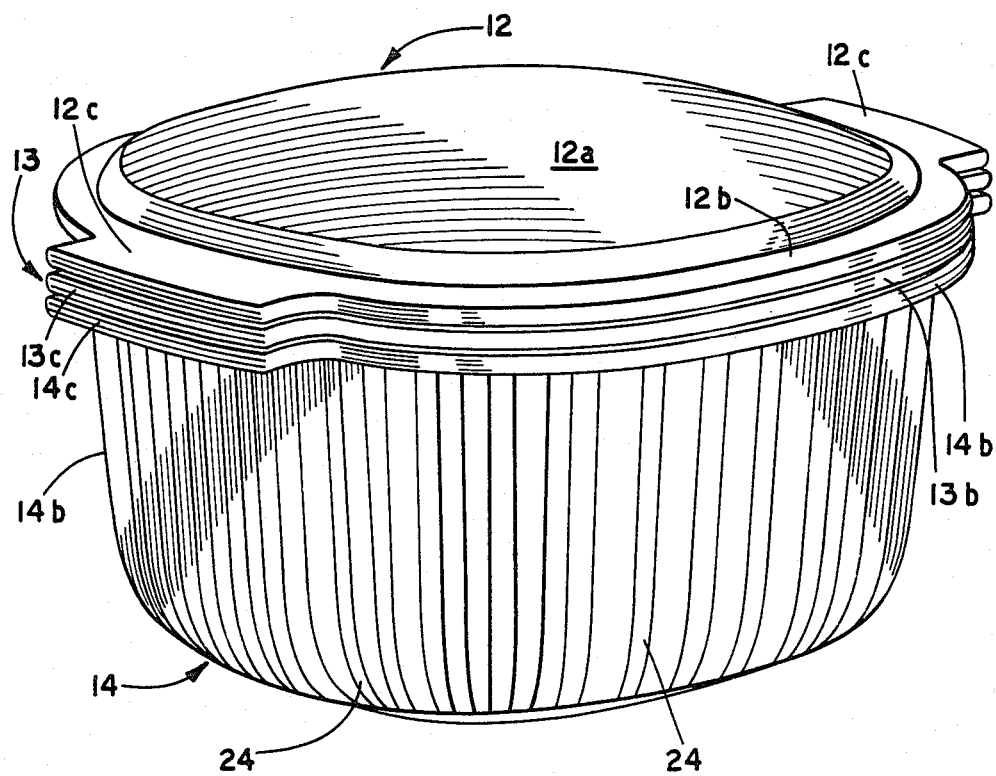
FIG. 1 is a perspective view of three microwave-transparent transparent receptacles assembled in nested relation for storage when not in use.
Figure 2:
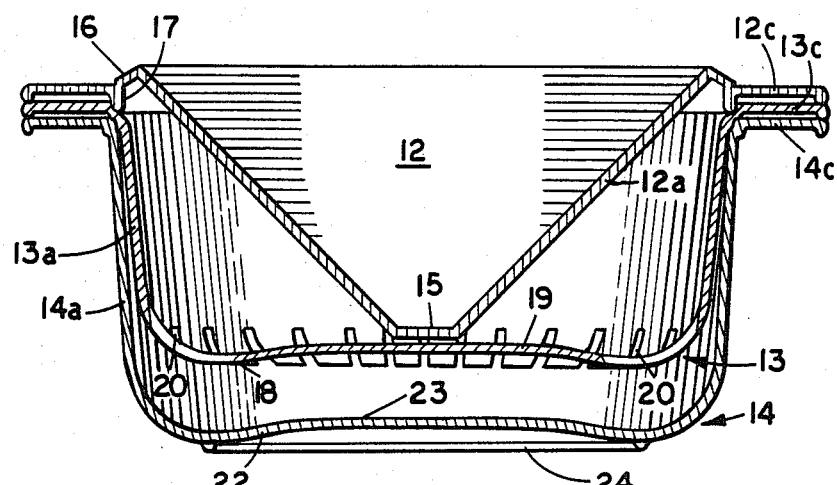
FIG. 2 is a cross-sectional view thereof on a reduced scale.

The three improved microwave-transparent receptacles shown in nested relation in FIGS. 1 and 2 comprise a substantially conical popping receptacle indicated generally at 12 and nested within a colander or perforated receptacle indicated generally at 13, which is in turn nested within an outer storage bowl or receptacle indicated generally at 14. These three receptacles may be made of any suitable and well-known microwave-transparent material, such as glass, ceramics and plastics, e.g., styrene and polycarbonate.

The three receptacles have bowl portions 12a, 13a and 14a with upper outturned horizontal rim flanges 12b, 13b and 14b, respectively, which are identical in size and shape and include diametrically opposite handle portions 12c, 13c and 14c, respectively. The three receptacles are generally of rounded square shape as viewed in plan, but these shapes may be varied so long as the rim and handle portions are identical in size and shape so that they interfit one upon another as shown in FIGS. 1, 2, 6 and 10.

Figure 3:
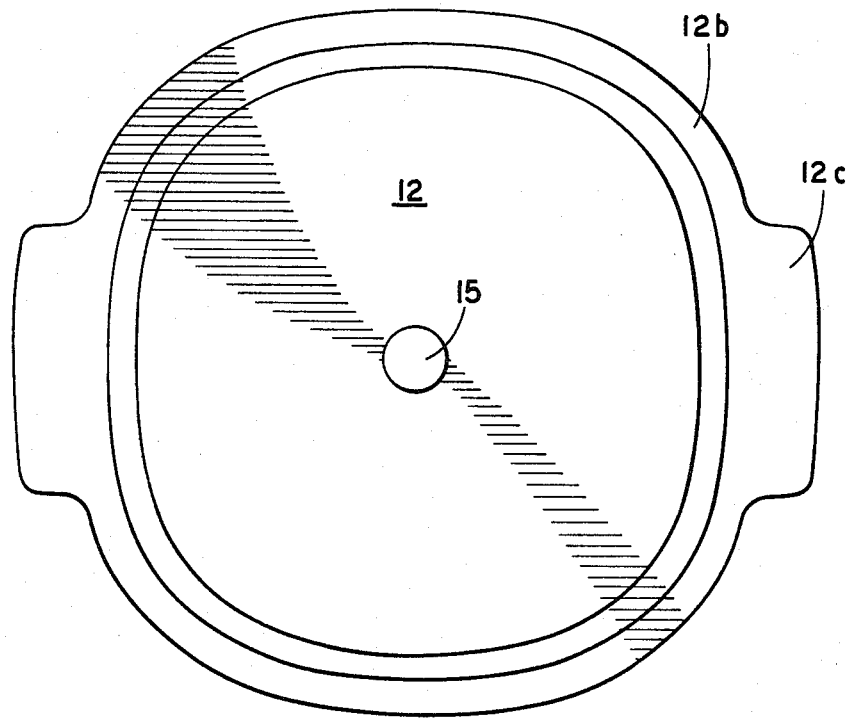
FIG. 3 is a top plan view thereof.
Figure 4:
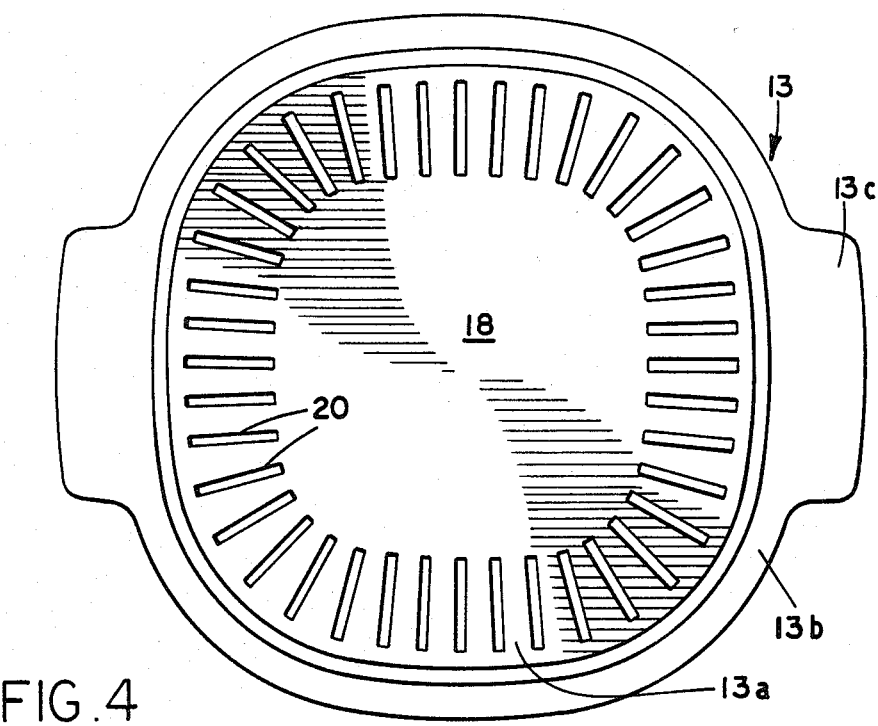
FIG. 4 is a top plan view of the perforated receptacle.
Figure 5:
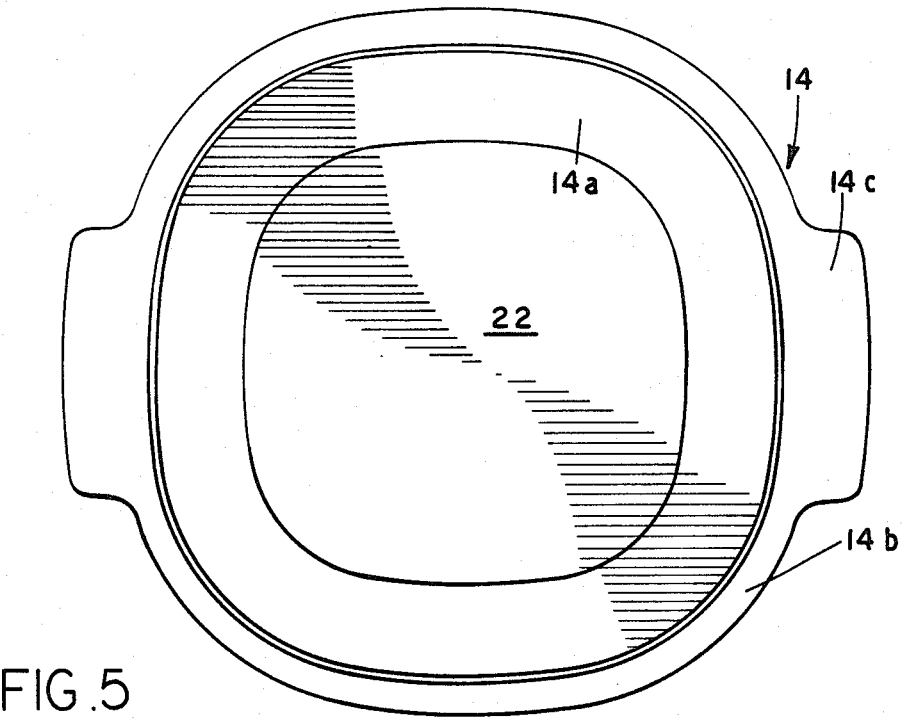
FIG. 5 is a top plan view of the storage receptacle.
Figure 6:
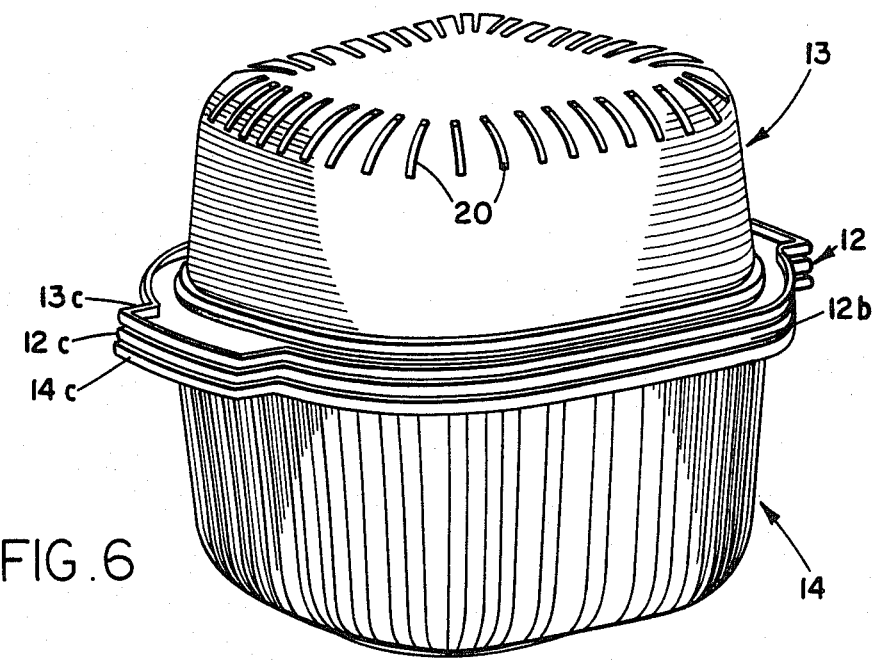
FIG. 6 is a perspective view of the three receptacles assembled in position for popping grain.
Figure 7:
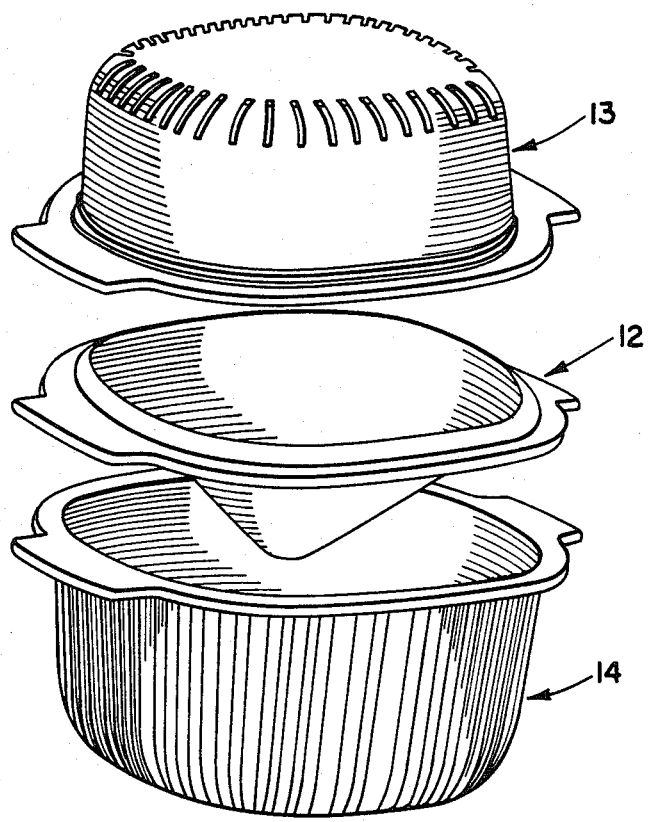
FIG. 7 is an exploded perspective view thereof on a reduced scale.

Referring to FIGS. 2 and 3, the bowl portion 12a of receptacle 12 has substantially conical side walls sloping downwardly inward and preferably terminating in a circular flat bottom wall 15. This shape has been found to be desirable for popping kernels as it has a restricted lower region for holding unpopped kernels in a clump and a larger upper region allowing heated kernels to expand and pop, as disclosed in U.S. Pat. Nos. 4,158,760 and 4,156,806. As shwon in FIGS. 2 and 10, the normally upper rim is connected to rim flange 12b by an inclined shoulder portion 16 and flange 12b may have a downturned lip 17 at its inner edge for facilitating nesting inside of the rim flange 13c of perforated receptacle 13, in the position of FIG. 2.

The bowl portion 13a of receptacle 13 has side walls which taper slightly inwardly and are curved inwardly at the bottom to merge into the bottom wall 18 which is preferably bulged upwardly at its central portion as shown at 19. A peripheral series of perforations, preferably in the form of slots 20, is formed in the curved portion and extend into the bottom wall, for purposes to be described.

The bowl portion 14a of receptacle 14 also has side walls which taper slightly inwardly and are curved inwardly at the bottom to merge into the bottom wall 22 which preferably bulges upwardly at its central portion as shown at 23. Preferably, an outer base rib 24 extends continuously around the outer periphery of the bulged portion 23 to form an edge contact with a flat supporting surface. The outer surfaces of bowl portions 13a and 14a may be provided with vertical ornamental ribs 24 as shown.

In order to pop grain in a microwave oven the popping receptacle 12 is nested within the receptacle 14 and a suitable quantity of unpopped grain is introduced into receptacle 12, forming a clump of grains in the lower portion of the cone. The perforated receptacle 13 is then inverted over receptacle 12 to form the assembly shown in FIG. 6, which is inserted into the microwave oven. As the heated grain expands or pops, the moisture released escapes as steam and is vented out through the slots 20, thus keeping the popped grain crisp and dry. When the grain is completely popped it may overflow into the area within receptacle 13.

Figure 8:
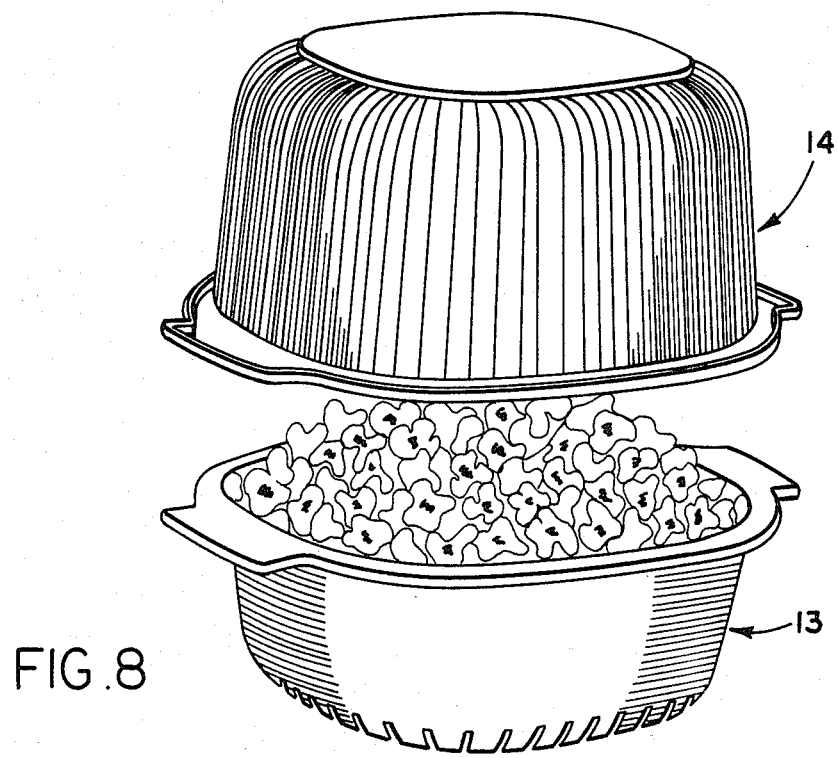
FIG. 8 is an exploded perspective view of the storage and perforated receptacles in inverted position with the popper receptacle removed, showing the popped grain in the perforated receptacle.
Figure 9:
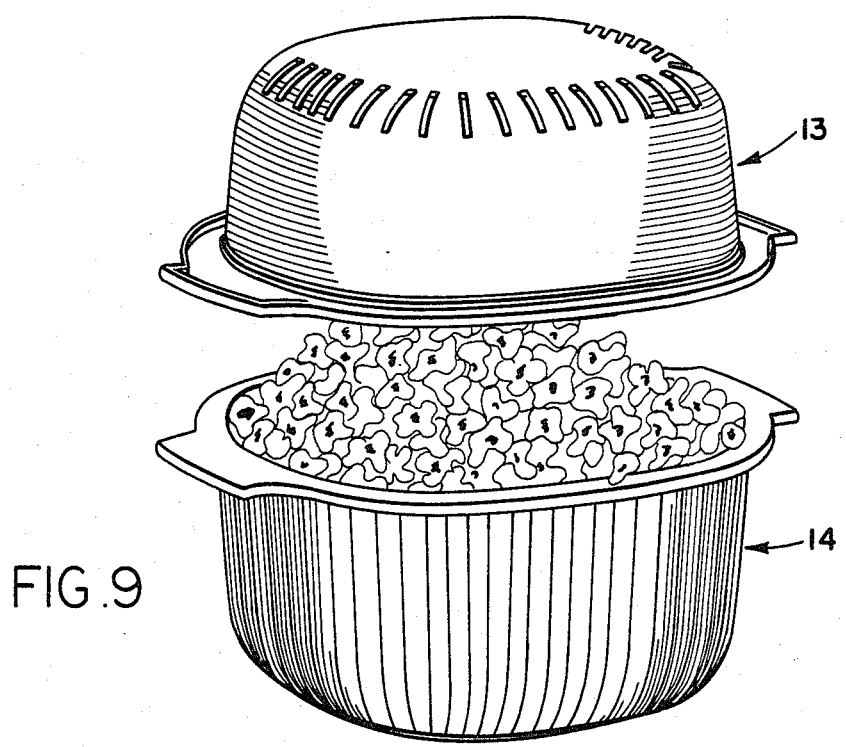
FIG. 9 is an exploded perspectivve view of the storage and perforated receptacles in re-inverted position, showing the popped grain transferred to the storage receptacle.

The whole assembly may now be inverted while holding the overlapped handles together and the popping receptacle 12 is then removed, transferring all the popped grain into perforated receptacle 13, as indicated in FIG. 8. By now assembling the receptacle 14 on top of receptacle 13 and re-inverting that assembly, all the popped grain is transferred into receptacle 14 for convenient access and storage, as indicated in FIG. 9.

Figure 10:
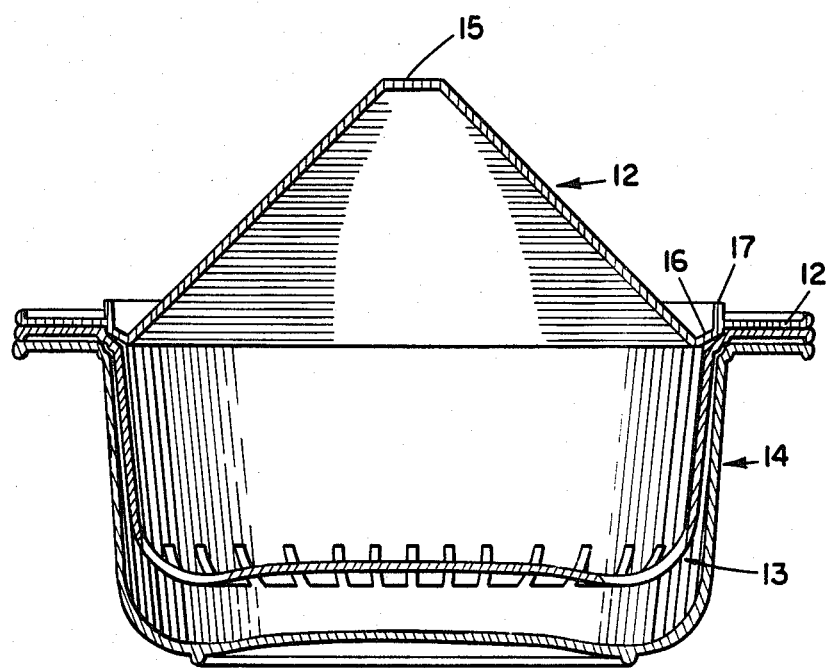
FIG. 10 is a cross-sectional view of the three receptacles assembled in position for defrosting, cooking or steaming certain other foods.

By rearranging the assembly of the three receptacles as shown in FIG. 10, frozen solid foods placed in receptacle 13 may be quickly defrosted in a microwave oven. As shown, the conical popping receptacle 12 may be inverted over receptacle 13 with its shoulder 16 at the rim nesting within the upper rim of receptacle 13. As the food thaws the inverted receptacle 12 collects condensed moisture and directs it onto the side walls of receptacle 13 and thence through the slots 20 into receptacle 14. At the same time excess liquids from the food are drained from the bulged portion 19 through the slots 20 into the bottom of receptacle 14.

In a similar manner ground meat may be cooked in a microwave oven when placed in receptacle 13 in the assembly arrangement of FIG. 10. The meat should be stirred at intervals to equalize temperature and to allow excess fat to drain off through the slots 20 and to collect in the bottom of receptacle 14 for subsequent disposal.

The assembly arrangement of FIG. 10 is also adapted for steaming vegetables in a microwave oven. In such case the bottom of receptacle 14 is filled with water to a level just below the bottom of receptacle 13 and the water is heated to near boiling temperature, then the vegetable is placed in receptacle 13 which is covered with inverted receptacle 12. The vegetable is then steam heated to the desired condition in a microwave oven by raising the water to boiling temperature.

It will be apparent that the three receptacles are combined in versatile manners to provide a novel system for heating in a microwave oven to pop grain, to defrost, cook and steam foods, and to nest for storage, by providing all receptacles with upper rim flanges and handles of identical size and shape. The bulged bottom portion and peripheral perforations of the colander cooperate with the other receptacles by venting and draining off excess moisture. Obviously, the colander and outer receptacle are adapted for other uses individually.

I claim:

1. A combination of microwave-transparent receptacles adapted selectively for cooking a variety of foods including popping grain in a microwave oven and storing the popped kernels and for defrosting, cooking and steaming other foods, comprising a storage receptacle having an upper rim, a conical popper receptacle having an upper rim, and a perforated receptacle nestable in said storage receptacle and having an upper rim, the popper receptacle being nestable in said perforated receptacle, the upper rims of said popper receptacle, perforated receptacle and storage receptacle adapted to fit one upon another in selective upright nested or inverted positions thereby supporting said respective receptacles relative to one another, said perforated receptacle adapted to confine popped kernels when assembled in inverted position on said popper receptacle in upright position within said storage receptacle, and to transfer popped kernels into said storage receptacle by bodily inverting said assembly, removing said popper receptacle and bodily reinverting said storage receptacle and said perforated receptacle.

2. A combination of microwave-transparent receptacles as described in claim 1, wherein said perforated receptacle is adapted to defrost, steam and cook other foods when supported within the storage receptacle with said popper receptacle supported in inverted position on said perforated receptacle.

3. A combination of microwave-transparent receptacles as described in claim 2, wherein said popper receptacle is nestable in said perforated receptacle when supported within said storage receptacle.

4. A combination of microwave-transparent receptacles as described in claim 2, wherein said perforated receptacle has a peripheral series of perforations in its bottom portion.

5. A combination of microwave-transparent receptacles as described in claim 4, wherein said popper receptacle is nestable in said perforated receptacle when supported within said storage receptacle.

6. A combination of microwave-transparent receptacles as described in claim 4, wherein the bottom wall of said perforated receptacle has an upwardly bulged central portion within said series of perforations.

7. A combination of microwave-transparent receptacles as described in claim 6, wherein said bottom of said perforated receptacle is spaced above the bottom wall of said storage receptacle when said perforated receptacle is nested therein.

8. A combination of microwave-transparent receptacles as described in claim 1, wherein said popper receptacle is nestable in said perforated receptacle when supported within said storage receptacle.

9. A combination of microwave-transparent receptacles as described in claim 8, wherein said perforated receptacle has a peripheral series of perforations in its bottom portion.

* * * * *